N. D. LEVIN.
TROLLEY MECHANISM.
APPLICATION FILED MAR. 5, 1909.
1,199,282.
Patented Sept. 26, 1916.
2 SHEETS—SHEET 2.
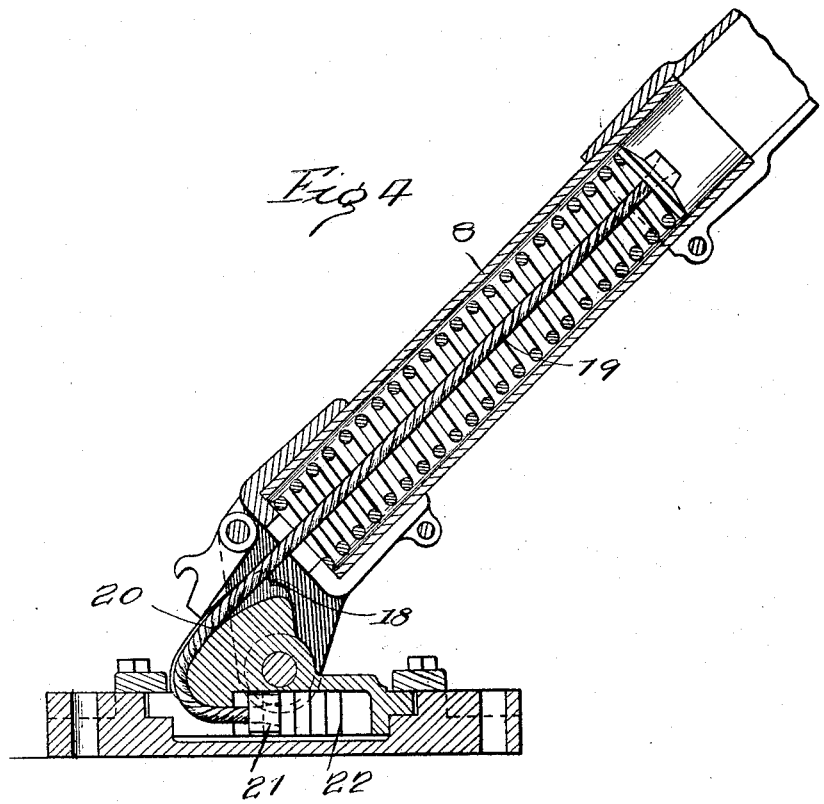
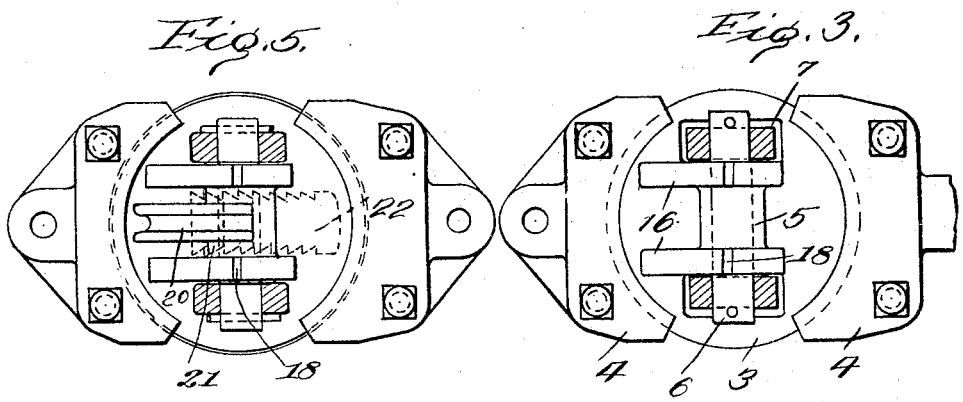

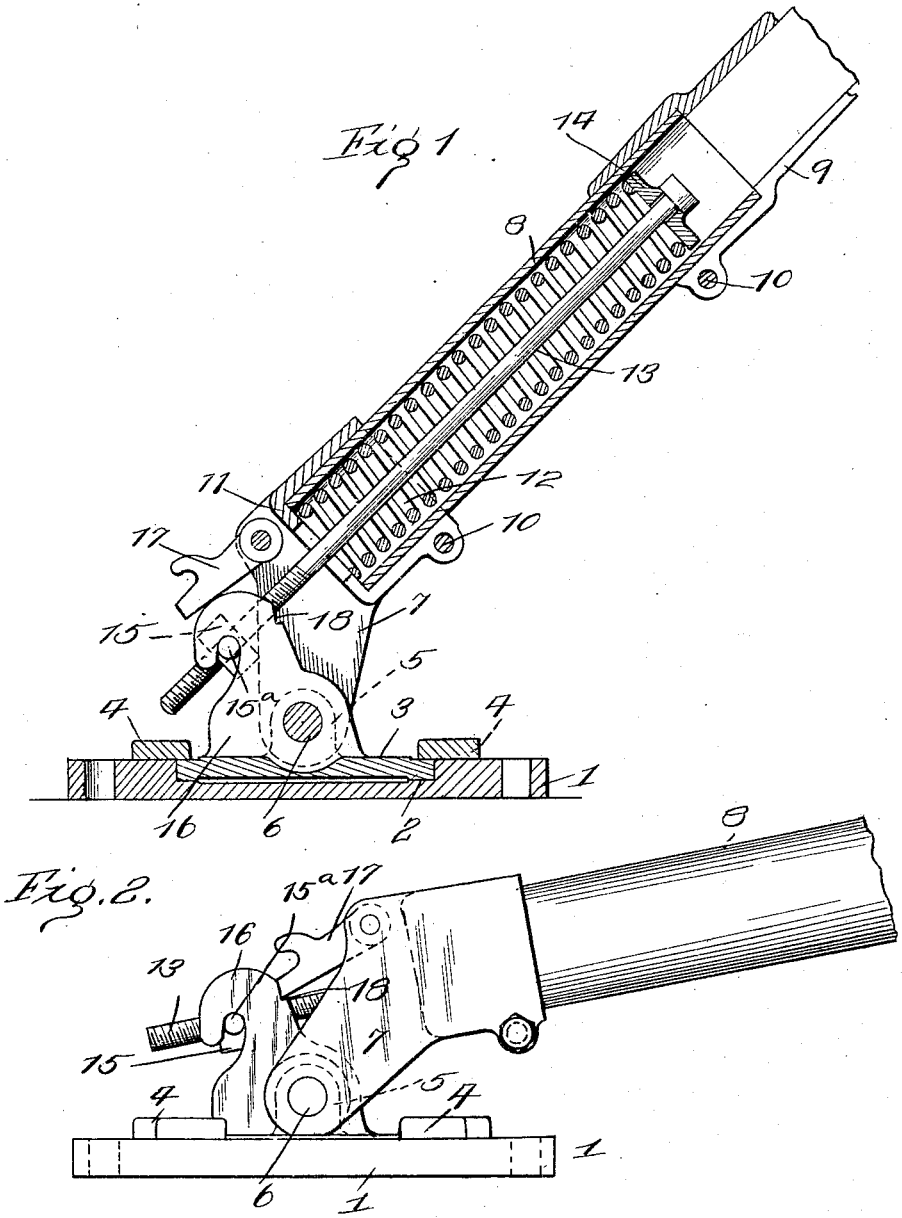

UNITED STATES PATENT OFFICE.

NILS D. LEVIN, OF COLUMBUS, OHIO, ASSIGNOR TO THE JEFFREY MANUFACTURING COMPANY.

TROLLEY MECHANISM.

1,199,282.   Specification of Letters Patent.   Patented Sept. 26, 1916.

Application filed March 5, 1909. Serial No. 481,525.

*To all whom it may concern:*

Be it known that I, NILS D. LEVIN, a citizen of the United States, residing at Columbus, in the county of Franklin and State of Ohio, have invented certain new and useful Improvements in Trolley Mechanisms, of which the following is a specification, reference being had therein to the accompanying drawing.

This invention relates to improvements in trolley supports and is especially adapted for use on locomotives used for haulage purposes in and about mines and similar places.

The object of the invention is to provide a trolley arm and support which is simple and compact and which is self-contained so that it may be readily attached to or removed from the car or locomotive.

In the drawings—Figure 1 shows one embodiment of my invention and is a cross-sectional elevation through the trolley support and lower part of the trolley arm. Fig. 2 is a side elevation showing the trolley arm located in its lower position. Fig. 3 is a plan view of the base, a cross section being taken through the bearing of the trolley arm. Fig. 4 shows another embodiment of my invention and is a cross sectional elevation of the trolley support and arm. Fig. 5 is a plan view of the trolley base shown in Fig. 4, a cross section being taken through the bearing of the trolley arm.

Referring to Figs. 1, 2 and 3 of the drawings, 1 indicates the lower bearing plate which is adapted to be bolted to the top of a car or locomotive. 2 is a circular bearing seat formed in the bearing plate 1. The bearing disk 3 is formed to engage the bearing seat 2 with a free working fit. The clips 4 are provided to hold the bearing disk 3 in position. The disk 3 is provided with a boss 5 through which extends a bearing pin 6.

The trolley arm consists of a lower bearing piece 7, an intermediate tube 8, and the upper arm 9. The bearing piece 7 and the upper arm 9 are each formed with a socket at one end adapted to engage the tube 8. Each socket is split at one side and is clamped firmly around the tube by means of a bolt 10. The lower bearing piece 7 is forked at its lower end, each of the prongs being apertured to engage the pin 6 and thus form a pivotal support for the trolley arm. At the lower end of the socket part of the bearing piece 7 is an inward projecting flange 11. The coil spring 12 lies in the tube 8 and at its lower end engages with the flange 11.

13 is a rod which extends through the tube 8 and through the coil spring 12 and is connected with the spring at its upper end by means of the washer 14. The rod is threaded at its lower end and carries the nut 15 which has transversely extending circular pivots or trunnions 15ª. The bearing disk 3 has two parallel lugs 16 which have hooks near their upper parts which engage the trunnions 15ª of the nut 15.

When the trolley arm and support is assembled the nut 15 is adjusted in place on the rod 13. The spring is compressed and its expansive force is transmitted through the rod 13 to the lugs 16 of the base. The action of the spring thus tends to throw the trolley arm upward into operative position and the effective force of the spring may be adjusted by changing the position of the nut 15.

The pawl 17 is pivotally mounted on the bearing piece 7 and is so positioned that it will automatically drop into the notches 18 of the lugs 16 when the trolley arm is drawn into its lower position, thus locking the arm.

In Figs. 4 and 5 of the drawings, I have shown a modified form of trolley arm and support embodying my invention. The construction is very similar to that before described except that a flexible cable 19 is substituted for the rod 13. This cable is attached at its upper end to the coil spring and its lower part passes over a curved lug 20. The lower end of the cable is provided with a button 21 which has laterally extending teeth. The bearing disk 3 is provided with a notched slot 22 into which the button 21 may be placed at various positions, the teeth of the button engaging the notches of the slot.

The lug 20 is preferably cam-shaped and so proportioned that the force at the outer end of the trolley arm will remain constant, as the elevation of the arm is changed. By adjusting the button 21 in the slot 22 the effective force of the spring may be changed as desired. I prefer to use a steel cable, but another form of flexible connection may be used if desired, as for instance, a chain.

In the drawings I have shown the trolley support provided with a separate lower bearing plate 1. I prefer this form of construction, but in some cases it may be desirable to form the bearing seat 2 in the frame or body of the car or locomotive.

It will be readily understood from a reference to the drawings and the foregoing description that the trolley arm and support provided by my invention is one which is self-contained and unitary. By removing the clips 4 the whole arm and supporting mechanism may be entirely removed from the car or locomotive. No socket in the frame of the car or locomotive is necessary and the clearance space required above the car or locomotive is very small. The spring and other moving parts are well protected from possible accident and are readily adjustable to change the pressure of the trolley arm. If it is necessary to disassemble the trolley pole for replacing any of the parts or for any other reason, this may be done by loosening the bolts 10. The tube 8 may then be removed without in any way disturbing the suporting mechanism or the adjustment of the spring.

What I claim is:

1. In a trolley arm and support, the combination of a base, a trolley arm pivotally mounted on the base, the lower part of the arm being hollow, a spring within the hollow part of the arm, and a flexible connection between the spring and the base, so that the spring may act to throw the arm into operative position, a portion of the base being so formed that the flexible connection will wrap around it as the position of the arm is changed, substantially as set forth.

2. In a trolley arm and support, the combination of a base, a trolley arm pivotally mounted on the base, the lower part of the arm being hollow, a spring within the hollow part of the arm, a flexible connection between the spring and the base, so that the spring may act to throw the arm into operative position, a portion of the base being so formed that the flexible connection will wrap around it as the position of the arm is changed, and means for adjusting the operative length of the flexible connection, substantially as set forth.

3. In a trolley arm and support, the combination of a base, a trolley arm pivotally mounted on the base, the lower part of the arm being hollow, a spring within the hollow part of the arm, a flexible connection wrapping around a portion of the base, as the position of the arm is changed, the said portion of the base being so formed that the perpendicular distance from the pivotal axis of the trolley arm to the flexible connection will vary in accordance with the position of the arm, substantially as set forth.

4. In a trolley arm and support, the combination of a base, a trolley arm pivotally mounted on the base, the trolley arm comprising a lower bearing member, and a sleeve detachably connected to the bearing member, a spring mounted within the sleeve and engaging at its lower end with the bearing piece, and connecting means between the upper end of the spring and the base, whereby the spring may act to throw the arm into operative position, substantially as set forth.

5. In a trolley arm and support, the combination of a base, a trolley arm pivotally mounted on the base, the lower part of the arm being hollow, a spring within the hollow part of the arm, a flexible connection between the spring and the base whereby the spring acts to throw the arm into operative position, a portion of the base being so formed that the flexible connection will wrap around it as the position of the arm is changed, and means for adjusting the tension of the spring, substantially as set forth.

6. In a trolley mechanism, the combination of a base, an arm connected to the base for movement about a horizontal pivotal axis and provided with an internal cylindrical chamber, a coil spring mounted in the chamber and held against movement at its lower end, a tension connection located within the spring and secured to it at its upper end, and means for securing the lower end of the connection to the base, whereby the expansive action of the spring tends to move the arm about its pivotal axis into operative position, substantially as set forth.

7. In a trolley mechanism, the combination of a base, an arm connected to the base for movement about a horizontal pivotal axis and provided with an internal cylindrical chamber, a coil spring within the chamber, an abutment for the lower end of the spring, a connection located within the spring and extending between its upper end and the base, the said connection being held in engagement with the base by the action of the spring and being otherwise freely removable from the base, substantially as set forth.

8. In a trolley mechanism, the combination of a base, an arm mounted on the base for movement about a horizontal pivotal axis, the said arm comprising a lower bearing piece, an upper element and an intermediate tubular element, a spring located within the tubular element, and a tension connection between the spring and the base so arranged that the spring may act to move the arm about its pivotal axis into operative position, substantially as set forth.

9. In a trolley mechanism, the combination of a base, an arm connected to the base for movement about a horizontal pivotal axis, the said arm comprising a lower bearing piece, an upper element and an intermediate tubular element, a coil spring mounted in the tubular element and held against movement at its lower end, and a tension connection extending within the spring from its upper end to the base and serving to transmit the force of the spring in a manner to cause the arm to be moved about its pivotal axis into operative position, substantially as set forth.

10. In a trolley mechanism, the combination of a base having an upstanding boss, a horizontal bearing pin mounted in the boss and projecting therefrom at both of its ends, a trolley arm having at its lower end two forks each of which is provided with a bearing aperture for one end of the pin, a spring mounted on the arm and movable as a whole therewith, and a tension connection between the spring and the boss on the base, the said connection serving to transmit the force of the spring to cause the arm to be moved about the pin into operative position, substantially as set forth.

11. In a trolley mechanism, the combination of a base having an upstanding boss, a horizontal pin mounted in the boss and projecting therefrom at both of its ends, a trolley arm having an internal cylindrical chamber and provided at its lower end with two forks each having a bearing aperture for one end of the pin, a coil spring mounted in the cylindrical chamber in the arm, and a centrally disposed tension connection secured at its upper end to the spring and engaging at its lower end with the boss on the base in such a way as to transmit the force of the spring to move the arm about the pin into operative position, substantially as set forth.

12. In a trolley mechanism, the combination of a base having an upstanding boss, a horizontal pin mounted in the boss and projecting therefrom at both of its ends, a trolley arm having therein a cylindrical chamber and provided at its lower end with two forks each having a bearing aperture for one end of the pin, a coil spring mounted in the chamber of the arm, a centrally disposed tension connection between the spring and the boss, whereby the force of the spring serves to move the arm about the pin into operative position, and a pawl pivotally mounted between the two forks of the arm and adapted to engage the boss on the base to lock the arm in its lower inoperative position, substantially as set forth.

13. In a trolley mechanism, the combination of a base, a boss on the base having two parallel upstanding lugs, a pin mounted in the boss and projecting therefrom at both of its ends, a trolley arm having therein a cylindrical chamber and provided at its lower end with two forks each of which has a bearing aperture for one end of the pin, a spring mounted in the cylindrical chamber and held against movement at one end, a tension connection between the other end of the spring and points on the said boss between the two upstanding lugs thereof whereby the force of the spring is transmitted to cause the movement of the arm about the pin into operative position, and a pawl pivotally mounted between the two forks of the arm and adapted to engage with the two lugs of the boss to lock the arm in its lower inoperative position, substantially as set forth.

In testimony whereof I affix my signature, in presence of two witnesses.

NILS D. LEVIN.

Witnesses:
H. B. ALEXANDER,
ARTHUR G. SKEELS.

Copies of this patent may be obtained for five cents each, by addressing the "Commissioner of Patents, Washington, D. C."